(12) United States Patent
Li

(10) Patent No.: US 7,268,721 B2
(45) Date of Patent: Sep. 11, 2007

(54) CAR REVERSING RADAR SENSOR HAVING FINE-TUNING FEATURE

(76) Inventor: Shih-Hsiung Li, 8F-1, No. 23, Sec. 1, Hangchow S. Rd., Taipei (TW)

( * ) Notice: Subject to any disclaimer, the term of this patent is extended or adjusted under 35 U.S.C. 154(b) by 234 days.

(21) Appl. No.: 11/189,639

(22) Filed: Jul. 26, 2005

(65) Prior Publication Data

US 2007/0024491 A1    Feb. 1, 2007

(51) Int. Cl.
*G01S 13/00* (2006.01)
*H01Q 3/02* (2006.01)

(52) U.S. Cl. ........................................ 342/23; 343/882
(58) Field of Classification Search .................. 342/70
See application file for complete search history.

(56) References Cited

U.S. PATENT DOCUMENTS

| 3,569,927 | A | * | 3/1971 | Guyton et al. | ............... 340/463 |
| 3,592,156 | A | * | 7/1971 | Prachar | ...................... 116/203 |
| 3,619,524 | A | * | 11/1971 | Gillund | ............... 200/61.45 M |
| 3,652,836 | A | * | 3/1972 | Richardson et al. | ......... 701/203 |
| 3,774,128 | A | * | 11/1973 | Orlando | ........................ 335/81 |
| 3,908,945 | A | * | 9/1975 | Shapiro et al. | ............. 248/165 |
| 4,391,477 | A | * | 7/1983 | Morrow, Sr. | ................. 384/592 |
| 4,740,804 | A | * | 4/1988 | Shands | ........................ 396/198 |
| 5,481,257 | A | * | 1/1996 | Brubaker et al. | ...... 340/825.69 |
| 5,757,485 | A | * | 5/1998 | Marcus et al. | .............. 356/479 |
| 5,757,486 | A | * | 5/1998 | Marcus et al. | .............. 356/479 |
| 6,615,121 | B2 | * | 9/2003 | Li | ............................... 701/36 |
| 6,621,067 | B2 | * | 9/2003 | He et al. | ..................... 250/225 |
| 6,693,520 | B2 | * | 2/2004 | Li | ............................... 340/435 |
| 6,866,635 | B2 | * | 3/2005 | Flesch et al. | ................ 600/459 |
| 7,084,744 | B2 | * | 8/2006 | Li | ............................... 340/435 |
| 2003/0078710 | A1 | * | 4/2003 | Li | ............................... 701/36 |
| 2003/0160687 | A1 | * | 8/2003 | Li | ............................... 340/435 |
| 2004/0061599 | A1 | * | 4/2004 | Li | ............................... 340/435 |
| 2004/0183660 | A1 | * | 9/2004 | Li | ............................... 340/435 |
| 2006/0176212 | A1 | * | 8/2006 | Li | ............................... 342/70 |
| 2007/0024491 | A1 | * | 2/2007 | Li | ............................... 342/70 |

* cited by examiner

*Primary Examiner*—Thomas H. Tarcza
*Assistant Examiner*—Shelley Chen
(74) *Attorney, Agent, or Firm*—William E. Pelton, Esq.; Cooper & Dunham LLP

(57) ABSTRACT

A car reversing radar sensor having a fine-tuning function includes a cylinder, a sensor module, a front cover, a packing block and a back cover. The sensor module is fitted in the cylinder and a sensing angle thereof can be adjusted. The packing block includes a push part a brake part, and a stick part. The packing block is mounted on the cylinder for securing the sensor module at a desired sensing position.

6 Claims, 3 Drawing Sheets ary direction to achieve the fine-tuning of the sensing angle via the sensor component 22.

CAR REVERSING RADAR SENSOR HAVING FINE-TUNING FEATURE

BACKGROUND OF THE INVENTION

1. Field of the Invention

The invention relates in general to a car reversing radar sensor, and more particularly to a car reversing radar sensor having a fine-tuning feature.

2. Description of the Related Art

Advances in radar electronics to assist in driving safety have resulted in the increasing demand for radar devices. In particular, more and more vehicles are fitted with car-reversing radar to assist in reversing the vehicle safely. The radar for reversing the vehicle provides information to a driver to learn whether an obstacle exists behind by transmitting and receiving reflected ultrasonic waves, so as to reverse or park the vehicle successfully. A sensing component emits the ultrasonic waves to feature an accurate sensing range. Therefore how to complete an accurate setting for a sensing range is an important issue.

However, the conventional radar reversing-assistance products are fitted at the rear of the vehicles, so that a sensing range is limited. If the car-reversing radar is installed on the vehicle having a high rear, the obstacles at lower positions are not easy to be sensed. On the other hand, if the car-reversing radar is installed on the vehicle having a low rear, the reflected ultrasonic waves from the ground tend to cause the erroneous judgment via the car reversing radar. Therefore the drivers need to adjust and even refit through trial and error the radar several times to achieve an optimal angle, which is troublesome, disappointing, and even dangerous as a layperson may not achieve the appropriate range.

SUMMARY OF THE INVENTION

It is therefore an objective of the present invention to provide a car reversing radar sensor having a fine-tuning feature by a sensing angle can be fine-tuned easily.

In order to achieve the above-mentioned objective, a car reversing radar sensor having a fine-tuning feature is provided. The car reversing radar sensor having the fine-tuning feature includes a hollow cylinder, a sensor module, a front cover, a packing block and a back cover.

The cylinder includes a chamber which includes a truncated spherical inner wall, and the chamber extends into a front end of the cylinder. Multiple clips are formed on an external surface of the chamber, and a gap extends from an external side of the chamber through to an interior of the chamber. The sensor module includes a truncated spherical external wall for mating with the chamber. The front cover is retained by the clips at the front of the chamber. The packing block is located in the gap of the chamber and an internal side of the packing block contacts the external wall of the sensor module. The packing block can move back and forth in parallel with an axis direction of the sensor module to retain or release the sensor module.

When the radar sensor of the present invention is configured at the rear of a vehicle, the sensor module can permit fine-tuning of the sensing angle in a very simple way. When a user has finished fine-tuning the sensing angle, the sensor module can be secured in position by pushing the packing block. Hence an adjustment operation of the car-reversing radar sensor of the present invention is very simple and easy.

DETAILED DESCRIPTION OF THE INVENTION

Figure 1:
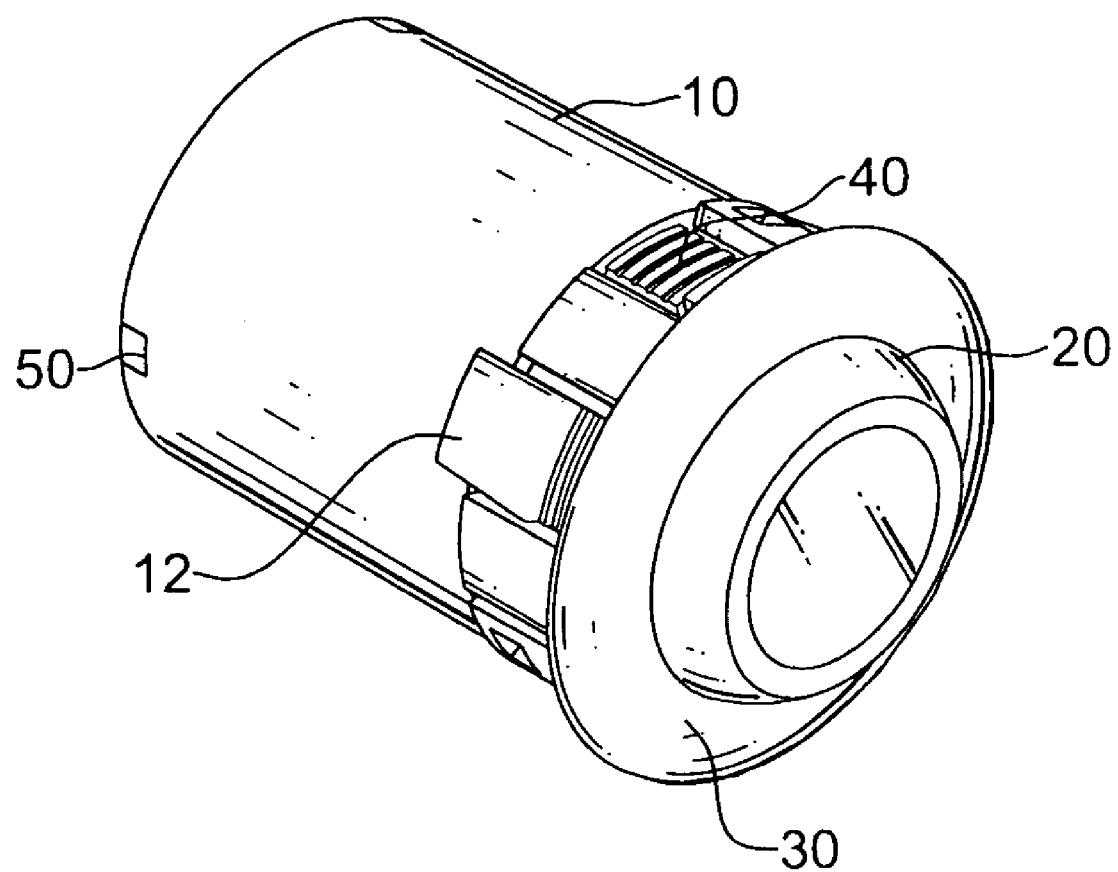
FIG. 1 is a perspective view of an assembled radar sensor with a fine-tuning feature in accordance with the present invention.

Referring to FIG. 1, a perspective view of an assembled radar sensor with a fine-tuning feature is shown. A hollow cylinder 10 encloses a sensor module 20 and a front cover 30 engages with a front end of the cylinder 10. The sensor module 20 can be adjusted within the cylinder 10 to change sensing angles, and also a packing block 40 is fitted to the cylinder 10 whereby the sensor module 20 is locked in position when adjustment of the sensing angle has finished.

Figure 2:
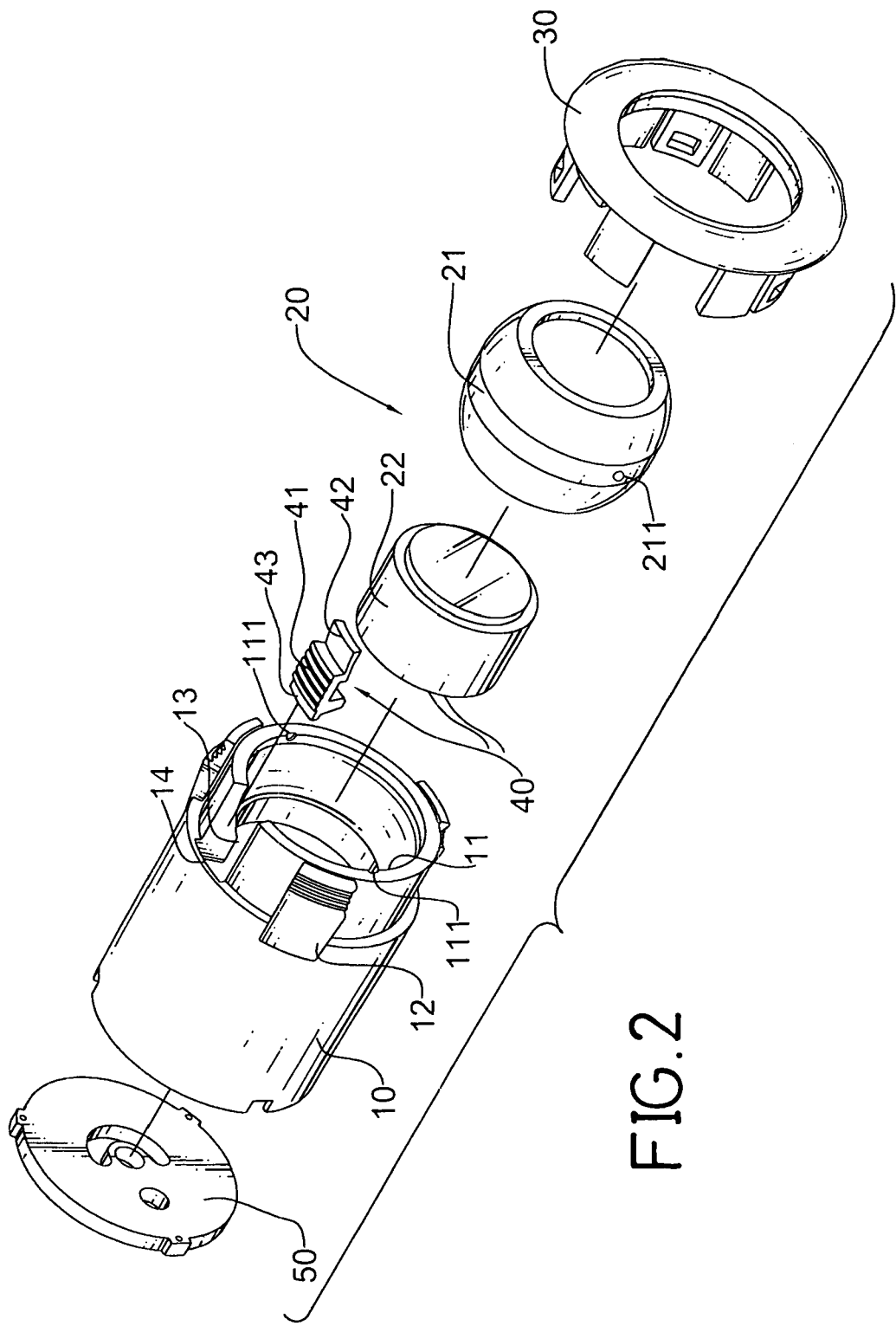
FIG. 2 is an exploded perspective view of the radar sensor in FIG. 1.

Referring to FIG. 2, the front end of the cylinder 10 forms a chamber 11 that is a truncated spherical inner wall. Multiple resilient clips 12 are formed on an external periphery defining the front end of the cylinder 10. Two diametrically-opposed cannelures 111 are defined in the chamber 11. A gap 13 extends from an external side of the chamber 11 through to an interior of the chamber 11. A trench 14 corresponding to the gap 13 is formed on an external edge of the cylinder 10. The sensor module 20 includes a casing 21 and a sensor component 22. The casing 21 is substantially spherical and is configured to mate with the chamber 11. Two diametrically-opposed stubs 211 are formed on the casing 21 for engaging respectively with the cannelures 111, so as to form an axis for the sensor module 20.

The front cover 30 fits in the front end of the chamber 11 and is retained by the clips 12. A back cover 50 is securely engaged at a rear end of the cylinder 10 and at least one hole is defined through the back cover 50 for electric wires to extend from a power source to the sensor 20.

The packing block 40 is located in the gap 13 of the chamber 11 and can move back and forth in parallel with an axis direction of the sensor module 20 to retain or release the sensor module 20. The packing block 40 includes a brake part 42, a push part 41, and a stick part 43. The stick part 43 is corresponding to the trench 14. The brake part 42 is located between the front cover 30 and the sensor module 20, and an internal side of the brake part 42 is in touch with the external wall of the casing 21 of the sensor module 20. The brake part 42 is moved by pushing the push part 41. When the brake part 42 moves backward, the brake part 42 moves along the external wall of the casing 21 of the sensor module 20 to hold the sensor module 20 tightly. On the contrary, when the brake part 42 moves forward, the brake part 42 moves along the external wall of the casing 21 of the sensor module 20 to release the sensor module 20.

Figure 3:
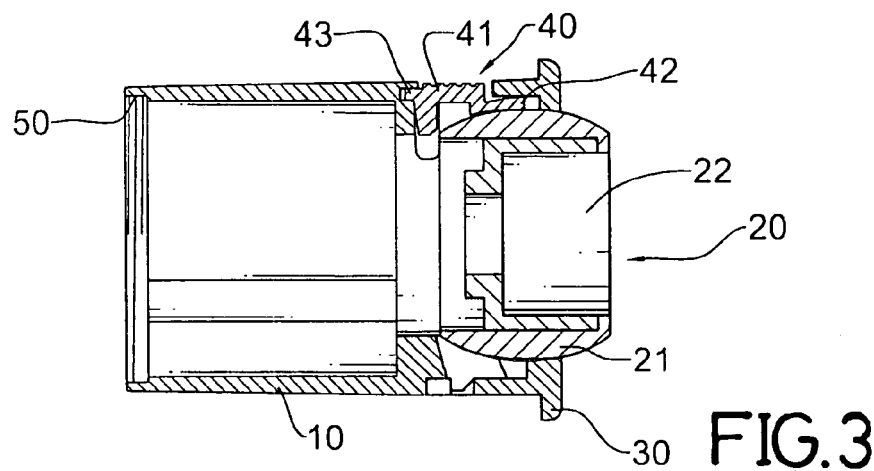
FIG. 3 is a cross-sectional side view of the radar sensor of the present invention.
Figure 4:
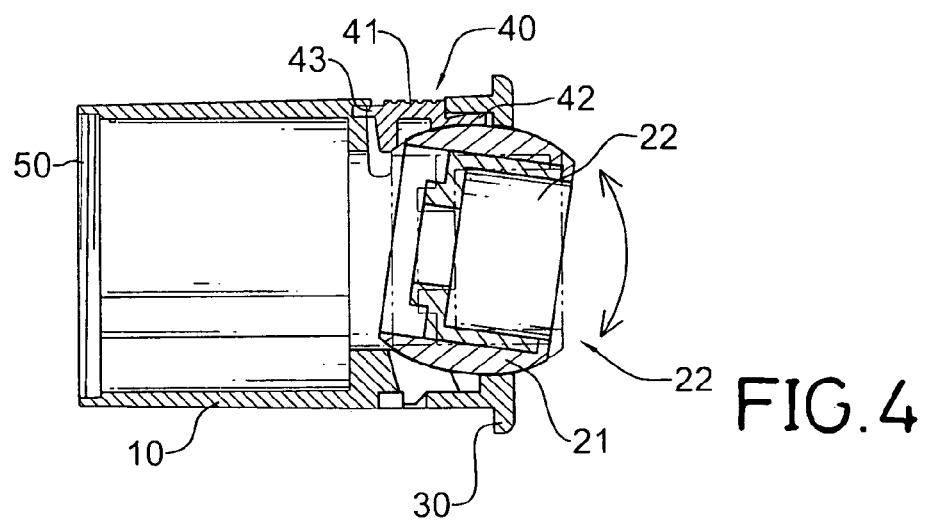
FIG. 4 is a cross-sectional side view of the radar sensor of the present invention showing an operation of the radar sensor.
Figure 5:
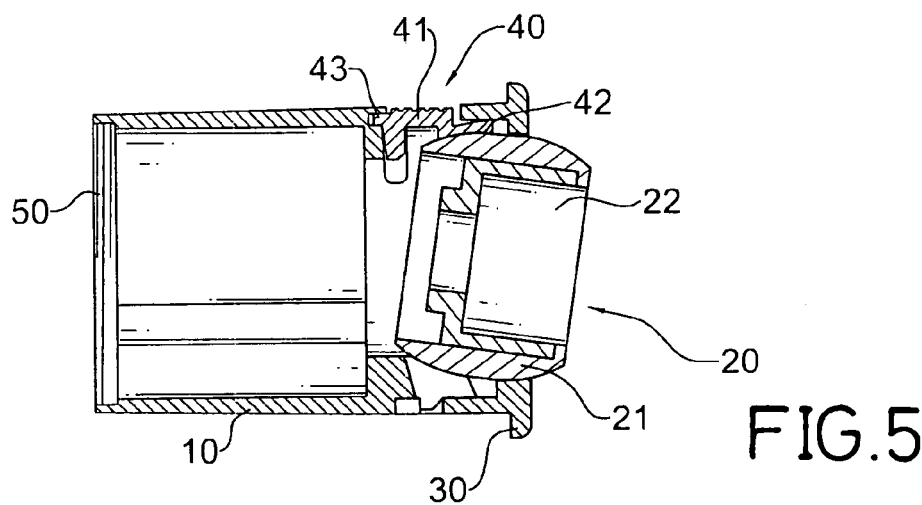
FIG. 5 shows a cross-sectional side view of the radar sensor of the present invention when the angle of the radar sensor is adjusted.

Referring to FIGS. 3-5, when the push part 41 of the packing block 40 is pushed backward to make the stick part 43 insert into the trench 14, the internal side of the brake part 42 presses the external wall of the sensor module 20. In this way, the sensor module 20 will be held tightly with an adjusted sensing angle as shown in FIG. 3 or FIG. 5. On the other hand, when the push part 41 is 40 pushed forward to locate the brake part 42 close to the front cover 30, the brake part 42 no longer presses the external wall of the sensor module 20, so that the sensor module 20 is released. Thereby the sensing angle along an axis of the two cannelures 111 of the chamber 11 and the two stubs 211 can be adjusted, as shown in FIG. 4.

Therefore, the car reversing radar sensor of the present invention provides the sensor module fitted to the shape of the chamber in the front end of the cylinder, so that the sensing angle of the module can be adjusted in a very simple way. When a user has finished fine-tuning the sensor 20, the sensor module can be secured in position by pushing the packing block. Moreover, all elements of the present invention are configured by means of fitting inside to be clipped together without locking actions; hence an assembly operation of the car-reversing radar sensor of the present invention is very simple and easy.

In conclusion, the present invention contributes to the radar sensor having the fine-tuning feature whereby the sensing angles of the sensor module can be adjusted easily. Therefore the car reversing radar sensor having the fine-tuning feature of the present invention obviously improves the conventional car reversing radar, so as to meet requirements of an invention patent.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A car reversing radar sensor having a fine-tuning feature comprising:
   a hollow cylinder defining a chamber at a front end of the cylinder, wherein the chamber comprises a truncated spherical inner wall, wherein at least one clip is formed on an external surface defining the chamber, and wherein a gap extends from the external surface defining the chamber through to an interior of the chamber;
   a sensor module comprising a truncated spherical external wall configured to mate with the truncated spherical inner wall of the chamber;
   a front cover for fitting in an opening of the chamber and adapted to be engagable by the at least one clip on the external surface of the chamber;
   a back cover mounted in a rear end of the hollow cylinder and defining at least one hole for wires to extend from the sensor to a power supply;
   a packing block located in the gap of the chamber and an internal side of the packing block selectively in contact with the external wall of the sensor module, wherein the packing block can move back and forth in parallel with an axis direction of the sensor module to retain or release the sensor module.

2. The car reversing radar sensor having the fine-tuning feature as claimed in claim 1, wherein two diametrically-opposed cannelures are formed on an internal side of the chamber.

3. The car reversing radar sensor having the fine-tuning feature as claimed in claim 1, wherein two diametrically-opposed stubs are formed on an exterior of the sensor module for engaging respectively with the cannelures.

4. The car reversing radar sensor having the fine-tuning feature as claimed in claim 2, wherein two diametrically-opposed stubs are formed on an exterior of the sensor module for engaging respectively with the cannelures.

5. The car reversing radar sensor having the fine-tuning feature as claimed in claim 1, wherein the packing block comprises a push part and a brake part, wherein the brake part is located between the front cover and the external wall of the sensor module, and an internal side of the brake part is in contact with the external wall of the sensor module.

6. The car reversing radar sensor having the fine-tuning feature as claimed in claim 5, wherein the packing block further comprises a stick part, and wherein a trench formed on the gap of the chamber is corresponding to the stick part.

* * * * *